United States Patent
Chen et al.

(10) Patent No.: US 9,653,803 B2
(45) Date of Patent: May 16, 2017

(54) RADIO FREQUENCY SIGNAL PROCESSING METHOD AND WIRELESS COMMUNICATION DEVICE

(71) Applicant: Wistron NeWeb Corporation, Hsinchu (TW)

(72) Inventors: Horen Chen, Hsinchu (TW); Ya-Ping Wei, Hsinchu (TW); Chieh-Wen Cheng, Hsinchu (TW); Chun-Hsiung Chuang, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 491 days.

(21) Appl. No.: 14/303,615

(22) Filed: Jun. 13, 2014

(65) Prior Publication Data

US 2015/0188596 A1 Jul. 2, 2015

(30) Foreign Application Priority Data

Dec. 27, 2013 (TW) .............................. 102148802 A

(51) Int. Cl.
*H01Q 3/24* (2006.01)
*H04B 1/40* (2015.01)
*H04B 7/06* (2006.01)
*H04B 7/08* (2006.01)

(52) U.S. Cl.
CPC ................. *H01Q 3/24* (2013.01); *H04B 1/40* (2013.01); *H04B 7/061* (2013.01); *H04B 7/0602* (2013.01); *H04B 7/0695* (2013.01); *H04B 7/088* (2013.01); *H04B 7/0814* (2013.01)

(58) Field of Classification Search
None
See application file for complete search history.

(56) References Cited

U.S. PATENT DOCUMENTS

| 8,175,532 B2 * | 5/2012 | Nanda ..................... H01Q 1/246 343/757 |
| 2004/0242273 A1 * | 12/2004 | Corbett ................ H04B 7/0837 455/562.1 |

(Continued)

FOREIGN PATENT DOCUMENTS

| CN | 1574698 A | 2/2005 |
| EP | 2 148 536 A1 | 1/2010 |

(Continued)

*Primary Examiner* — Gregory C Issing
(74) *Attorney, Agent, or Firm* — Winston Hsu; Scott Margo

(57) ABSTRACT

A radio frequency signal processing method for a wireless communication device, which includes an omni-directional antenna and a plurality of directional antennas, includes receiving a request signal from a first sending node with the omni-directional antenna, sending a confirming signal to the first sending node with the omni-directional antenna, receiving a data signal from the first sending node with a first directional antenna of the plurality of directional antennas according to the request signal and a result of a training packet process, transmitting an acknowledge signal to the first sending node with the first directional antenna, and receiving follow-up signals with the omni-directional antenna. The request signal is utilized to ask the wireless communication device to receive the data signal.

8 Claims, 7 Drawing Sheets

(56) References Cited

U.S. PATENT DOCUMENTS

| | | | |
|---|---|---|---|
| 2005/0037822 A1* | 2/2005 | Regnier | H01Q 1/2258 455/575.5 |
| 2005/0075141 A1* | 4/2005 | Hoffmann | H04B 7/0408 455/562.1 |
| 2005/0088995 A1* | 4/2005 | Li | H04B 7/0608 370/332 |
| 2005/0285803 A1* | 12/2005 | Iacono | H04W 16/24 343/702 |
| 2007/0011554 A1 | 1/2007 | Trainin | |
| 2007/0147312 A1 | 6/2007 | Shapira | |

FOREIGN PATENT DOCUMENTS

| | | |
|---|---|---|
| TW | I261992 | 9/2006 |
| TW | 201212382 | 3/2012 |

\* cited by examiner

RADIO FREQUENCY SIGNAL PROCESSING METHOD AND WIRELESS COMMUNICATION DEVICE

BACKGROUND OF THE INVENTION

1. Field of the Invention

The present invention relates to a radio frequency signal processing method and a wireless communication device, and more particularly, to a radio frequency signal processing method and a wireless communication device that switch between an omni-directional antenna and a directional antenna to improve the quality of reception.

2. Description of the Prior Art

Electronic products with wireless communication functionalities, such as laptops, personal digital assistants (PDAs), wireless base stations, mobile phones, smart meters and USB dongles, utilize antennas to emit and receive radio waves for transmitting or exchanging radio signals, so as to access wireless networks. In such a situation, the performance of transmission tends to be affected by ambient variations. For example, performance of a transceiver of a wireless communication system may be degraded (e.g. having reduced signal-to-noise ratio (SNR), increased packet error ratio (PER), low transmission rate, phenomenon of packet retransmission) by serious channel effects, by interference induced by other wireless communication systems or electronic devices, by shielding effects induced by surrounding buildings, or by directions or positions of antennas of the wireless communication system. Therefore, it is a common goal in the industry to effectively improve the quality of reception in the wireless communication system.

SUMMARY OF THE INVENTION

It is therefore an objective of the present invention to provide a radio frequency signal processing method and a wireless communication device, which improve the quality of reception and efficiency by switching between an omni-directional antenna and a directional antenna.

An embodiment of the invention provides a radio frequency signal processing method, adapted to a wireless communication device including an omni-directional antenna and a plurality of directional antennas. The radio frequency signal processing method includes receiving a request signal from a first sending node with the omni-directional antenna, and sending a confirming signal to the first sending node with the omni-directional antenna, wherein the request signal is utilized to request the wireless communication device to receive a data signal; receiving the data signal from the first ending node with a first directional antenna of the plurality of directional antennas according to the request signal and a result of a training packet process; and transmitting an acknowledge signal to the first sending node with the first directional antenna after the data signal is completely received, and receiving follow-up signals with the omni-directional antenna.

Another embodiment of the invention provides a wireless communication device including an omni-directional antenna, a plurality of directional antennas and a radio signal processing unit configured to execute a radio frequency signal processing method. The radio frequency signal processing method includes receiving a request signal from a first sending node with the omni-directional antenna, and sending a confirming signal to the first sending node with the omni-directional antenna, wherein the request signal is utilized to request the wireless communication device to receive a data signal; receiving the data signal from the first ending node with a first directional antenna of the plurality of directional antennas according to the request signal and a result of a training packet process; and transmitting an acknowledge signal to the first sending node with the first directional antenna after the data signal is completely received, and receiving follow-up signals with the omni-directional antenna.

These and other objectives of the present invention will no doubt become obvious to those of ordinary skill in the art after reading the following detailed description of the preferred embodiment that is illustrated in the various figures and drawings.

DETAILED DESCRIPTION

In general, according to radiation pattern, there are two major categories of antennas: directional and omni-directional. Omni-directional antennas are designed to send and receive signals in all horizontal directions from the antennas, while a directional antenna is designed to focus signals in a single direction. In the present invention, both an omni-directional antenna and directional antennas are disposed in a wireless communication device. By switching between the omni-directional antenna and the directional antennas in different situations, interference may decrease, and signal quality and data rate can be improved.

Figure 1:
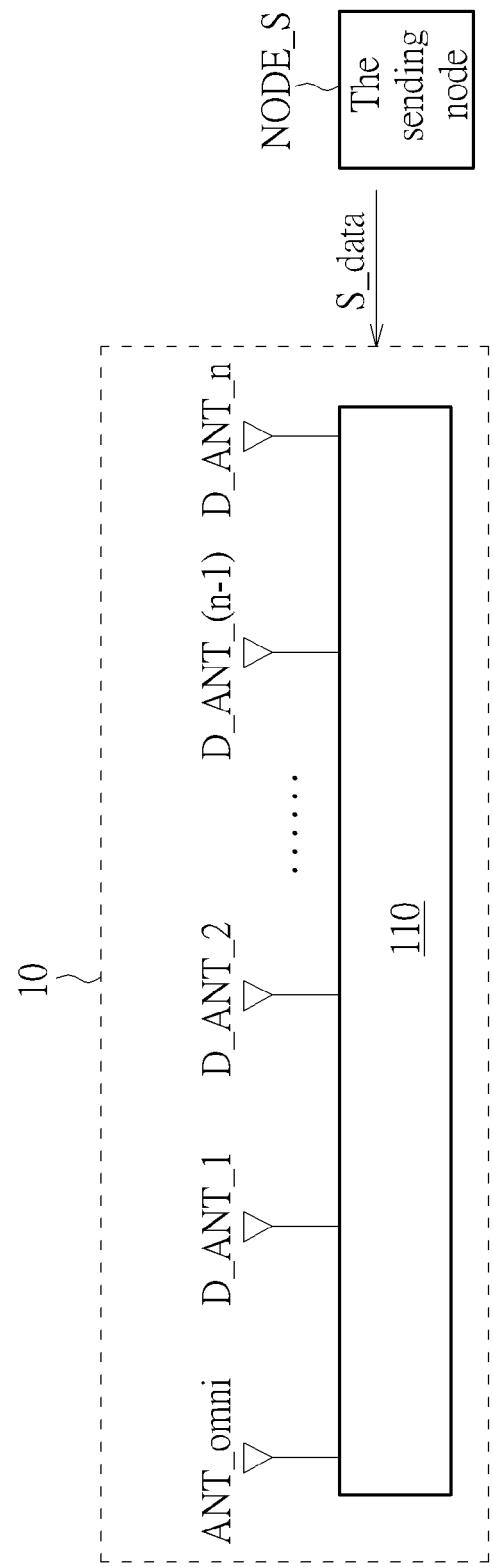
FIG. 1 is a schematic diagram illustrating a wireless communication device according to an embodiment of the present invention.

Please refer to FIG. 1. FIG. 1 is a schematic diagram illustrating a wireless communication device 10 according to an embodiment of the present invention. The wireless communication device 10 comprises an omni-directional antenna ANT_omni, directional antennas D_ANT_1-D_ANT_n and a radio signal processing unit 110. When a sending node NODE_S tries to transmit a data signal S_data, the radio signal processing unit 110 selects one from the omni-directional antenna ANT_omni and the directional antennas D_ANT_1-D_ANT_n to receive the data signal S_data according to a result of a training packet process in order to ensure signal quality (or the quality of reception). It is worth noting that compared with an omni-directional antenna, an ordinary directional antennas has many advantages in a corresponding directional radiation pattern, such as higher gain for desired signals, longer transmission distance, better received signal strength indicator (RSSI), lower packet error rate (PER), lower side lobe for interference, lower noise floor, and less power consumption under the same equivalent isotropically radiated power (EIRP) requirements. Therefore, utilizing a suitable directional antenna to receive the data signal S_data can decrease interference and improve signal quality and data rate.

Figure 2A:
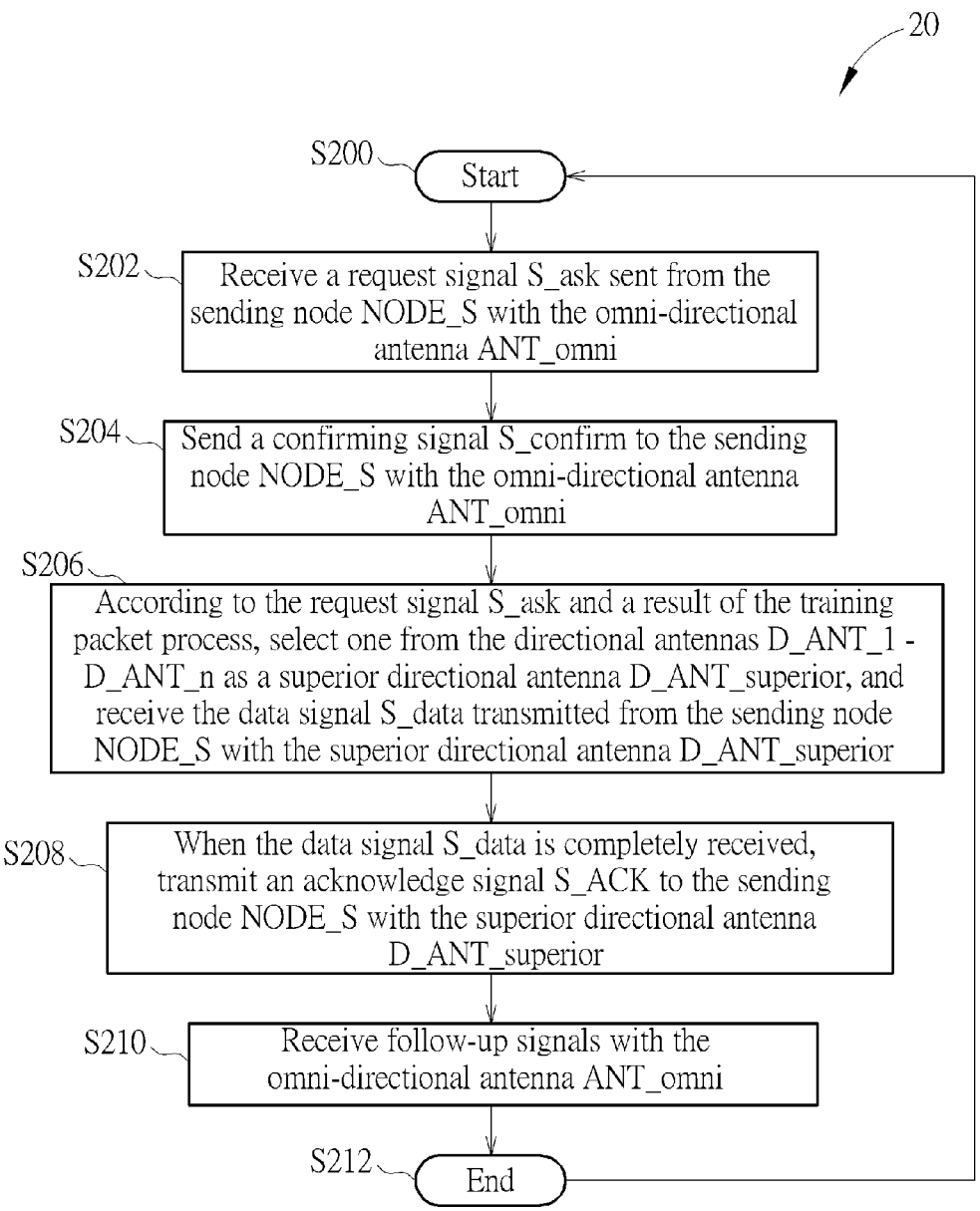
FIG. 2A is a flow schematic diagram illustrating a radio frequency signal processing method according to an embodiment of the present invention.
Figure 2B:
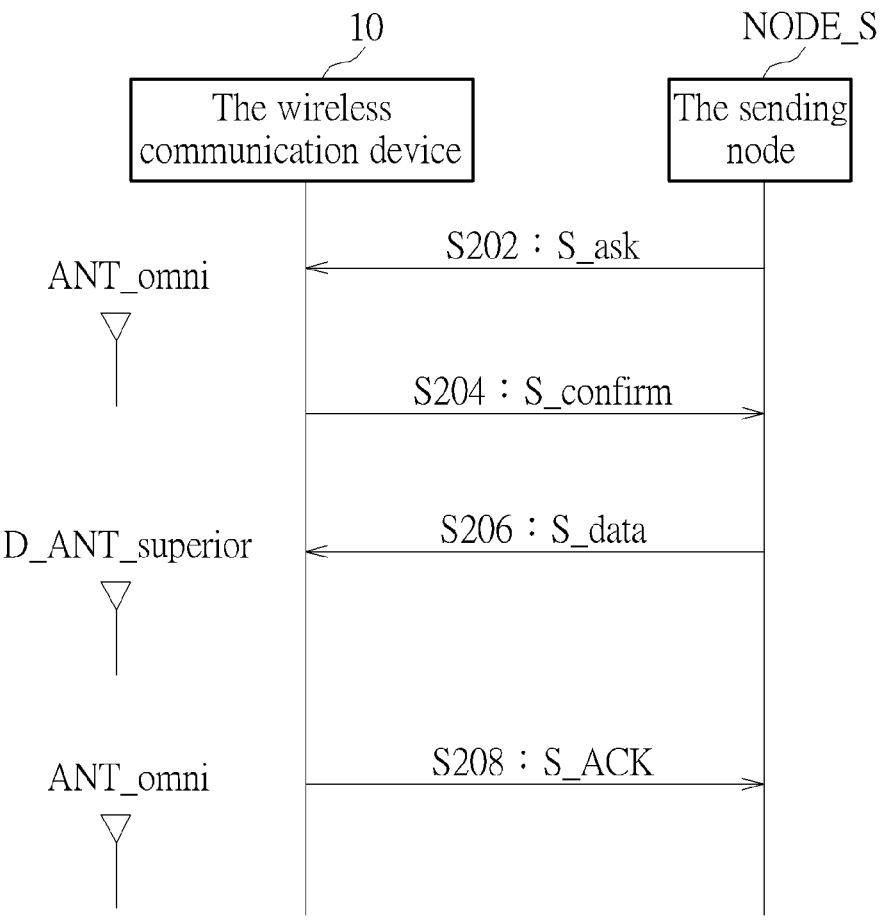
FIG. 2B is a sequence schematic diagram illustrating the radio frequency signal processing method.

Please refer to FIGS. 2A and 2B. FIG. 2A is a flow schematic diagram illustrating a radio frequency signal processing method 20 according to an embodiment of the present invention. FIG. 2B is a sequence schematic diagram illustrating the radio frequency signal processing method 20. The radio frequency signal processing method 20 can be executed by the radio signal processing unit 110, and includes steps as follows.

Step S200: Start.

Step S202: Receive a request signal S_ask sent from the sending node NODE_S with the omni-directional antenna ANT_omni.

Step S204: Send a confirming signal S_confirm to the sending node NODE_S with the omni-directional antenna ANT_omni.

Step S206: According to the request signal S_ask and a result of the training packet process, select one from the directional antennas D_ANT_1-D_ANT_n as a superior directional antenna D_ANT_superior, and receive the data signal S_data transmitted from the sending node NODE_S with the superior directional antenna D_ANT_superior.

Step S208: When the data signal S_data is completely received, transmit an acknowledge signal S_ACK to the sending node NODE_S with the superior directional antenna D_ANT_superior.

Step S210: Receive follow-up signals with the omni-directional antenna ANT_omni.

Step S212: End.

In other words, when the sending node NODE_S tries to transmit the data signal S_data to the wireless communication device 10, the sending node NODE_S first sends the request signal S_ask to request the wireless communication device 10 to receive the data signal S_data. Since the wireless communication device 10 must be able to pick up signals sent from other sending nodes as well, the omni-directional antenna ANT_omni, which covers a broader area, is chosen for this situation, such that wireless signals from all directions are covered equally. When the request signal S_ask is received by the omni-directional antenna ANT_omni, the radio signal processing unit 110 utilizes the omni-directional antenna ANT_omni to respond to the sending node NODE_S (with the confirming signal S_confirm) in order to instruct the sending node NODE_S to start transmitting the data signal S_data. According to the request signal S_ask and the result of the training packet process, the radio signal processing unit 110 can determine which one of the directional antennas D_ANT_1-D_ANT_n is best suited for the sending node NODE_S and then select the one from the directional antennas D_ANT_1-D_ANT_n as a superior directional antenna D_ANT_superior; accordingly, the data signal S_data transmitted from the sending node NODE_S can be received by the superior directional antenna D_ANT_superior to decrease interference and improve signal quality and data rate. When the data signal S_data is completely received, the radio signal processing unit 110 transmits the acknowledge signal S_ACK to the sending node NODE_S with the superior directional antenna D_ANT_superior to inform the sending node NODE_S about the end of receiving data. Finally, the radio signal processing unit 110 switches over to the omni-directional antenna ANT_omni again to pick up other signals.

Consequently, by means of the radio frequency signal processing method 20, the radio signal processing unit 110 utilizes a suitable directional antenna to receive the data signal S_data from the sending node NODE_S to ensure signal quality and data rate but decrease interference. In addition, unless the wireless communication device 10 is receiving the data signal S_data, the wireless communication device 10 normally switches over to the omni-directional antenna ANT_omni, such that signals from any direction would be caught.

It is worth noting that the data signal S_data may be signals of any type, and the total amount of the data signal S_data is greater than the total amount of the request signal S_ask, the total amount of the confirming signal S_confirm and the total amount of the acknowledge signal S_ACK—that is, the total number of bits of the data signal S_data is larger. Alternatively, the data signal S_data may be important data or have priority over other signals—but not limited thereto—and thus transmission quality and data rate of the data signal S_data are more strictly required. Besides, the radio signal processing unit 110 selects one from the directional antennas D_ANT_1-D_ANT_n as a superior directional antenna D_ANT_superior according to a result of the training packet process, and the training packet process is utilized to determine which of the directional antennas D_ANT_1-D_ANT_n corresponding to the sending node NODE_S has the best efficiency and select it as the superior directional antenna D_ANT_superior. The radio signal processing unit 110 may perform the training packet process when the sending node NODE_S and the wireless communication device 10 establish a connection; however, the present invention is not limited to this, and, for example, the radio signal processing unit 110 may perform the training packet process periodically or when a movement of the wireless communication device 10 occurs. Moreover, the training packet process may be implemented in many ways.

Figure 3A:
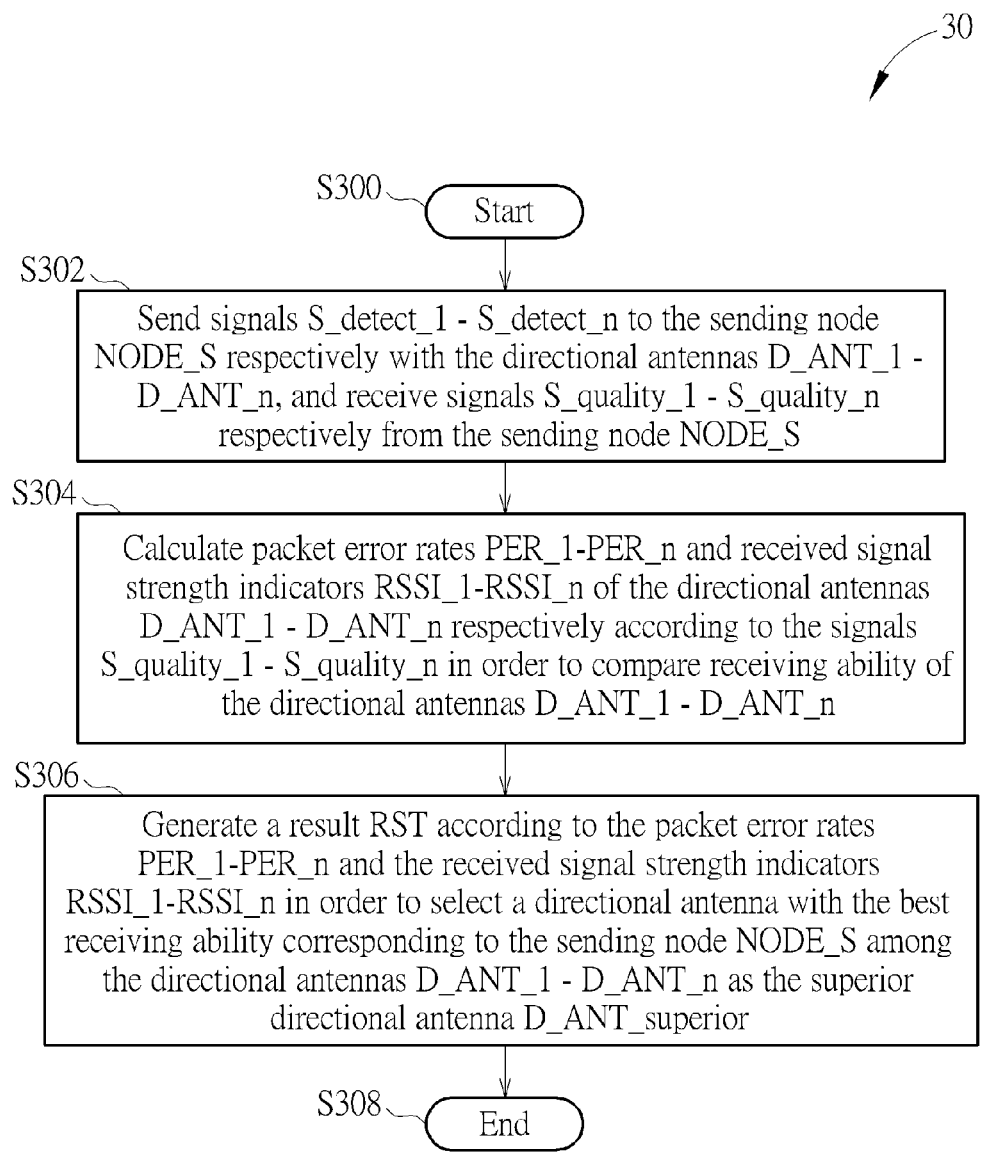
FIG. 3A is a flow schematic diagram illustrating a training packet process according to an embodiment of the present invention.
Figure 3B:
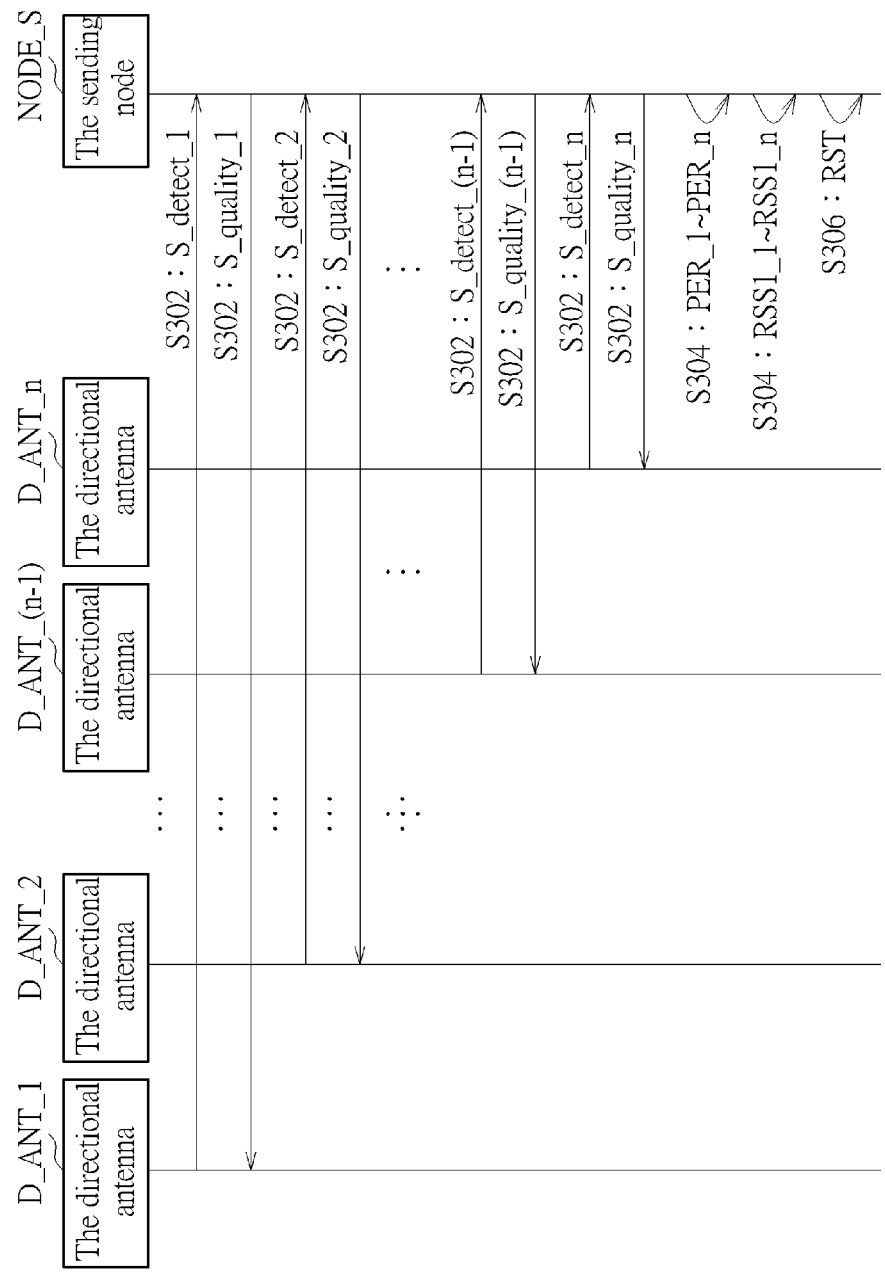
FIG. 3B is a sequence schematic diagram illustrating the training packet process.

For example, please refer to FIGS. 3A and 3B. FIG. 3A is a flow schematic diagram illustrating a training packet process 30 according to an embodiment of the present invention. FIG. 3B is a sequence schematic diagram illustrating the training packet process 30. The training packet process 30 can be executed by the radio signal processing unit 110 to determine the superior directional antenna D_ANT_superior corresponding to the sending node NODE_S. The training packet process 30 includes steps as follows.

Step S300: Start.

Step S302: Send signals S_detect_1-S_detect_n to the sending node NODE_S respectively with the directional antennas D_ANT_1-D_ANT_n, and receive signals S_quality_1-S_quality_n respectively from the sending node NODE_S.

Step S304: Calculate packet error rates PER_1-PER_n and received signal strength indicators RSSI_1-RSSI_n of the directional antennas D_ANT_1-D_ANT_n respectively according to the signals S_quality_1-S_quality_n in order to compare receiving ability of the directional antennas D_ANT_1-D_ANT_n.

Step S306: Generate a result RST according to the packet error rates PER_1-PER_n and the received signal strength indicators RSSI_1-RSSI_n in order to select a directional antenna with the best receiving ability corresponding to the sending node NODE_S among the directional antennas D_ANT_1-D_ANT_n as the superior directional antenna D_ANT_superior.

Step S308: End.

As set forth above, to select the superior directional antenna D_ANT_superior corresponding to the sending node NODE_S from the directional antennas D_ANT_1-

D_ANT_n (for example, when the sending node NODE_S and the wireless communication device 10 establish a connection or when the wireless communication device 10 moves or every predetermined interval of time), the radio signal processing unit 110 sends the signals S_detect_1-S_detect_n to the sending node NODE_S respectively with the directional antennas D_ANT_1-D_ANT_n, and picks up the signals S_quality_1-S_quality_n respectively from the sending node NODE_S. Subsequently, the radio signal processing unit 110 measures the packet error rates PER_1-PER_n of the directional antennas D_ANT_1-D_ANT_n and calculates the received signal strength indicators RSSI_1-RSSI_n of the directional antennas D_ANT_1-D_ANT_n respectively according to (the quality of) the signals S_quality_1-S_quality_n so as to compare receiving ability of the directional antennas D_ANT_1-D_ANT_n (i.e., antenna ability of receiving signals). In other words, the directional antenna D_ANT_1 sends the signal S_detect_1 to the sending node NODE_S and then receives the signal S_quality_1 from the sending node NODES; on the other hand, the radio signal processing unit 110 calculates the packet error rate and the received signal strength indicator of the directional antenna D_ANT_1. Likewise, the directional antenna D_ANT_2 sends the signal S_detect_2 to the sending node NODE_S and then receives the signal S_quality_2 from the sending node NODES; on the other hand, the radio signal processing unit 110 calculates the packet error rate and the received signal strength indicator of the directional antenna D_ANT_2. By the same token, the directional antenna D_ANT_n at last receives the signal S_quality_n from the sending node NODE_S, and the radio signal processing unit 110 calculates the packet error rate and the received signal strength indicator of the directional antenna D_ANT_n. Accordingly, the radio signal processing unit 110 can determine which of the directional antennas D_ANT_1-D_ANT_n corresponding to the sending node NODE_S has the best receiving ability and select it as the superior directional antenna D_ANT_superior. Therefore, the radio signal processing unit 110 can use the superior directional antenna D_ANT_superior to receive the data signal S_data output from the sending node NODE_S to decrease interference and improve signal quality and data rate.

Therefore, with the training packet process 30, the radio signal processing unit 110 can select a directional antenna with the best receiving ability corresponding to the sending node NODE_S among the directional antennas D_ANT_1-D_ANT_n as the superior directional antenna D_ANT_superior, and utilize the directional antenna D_ANT_superior to receive the data signal S_data sent from the sending node NODE_S. Please note that the packet error rate and the received signal strength indicator are not the only way to determine receiving ability, because other approaches may be feasible as well according to different systems and not limited herein.

Moreover, the wireless communication device 10 shown in FIG. 1, the radio frequency signal processing method 20 shown in FIG. 2 or the training packet process 30 shown in FIG. 3 are exemplary embodiments of the invention, and those skilled in the art can make alternations and modifications accordingly. For example, the radio signal processing unit 110 may comprise a switch or a multiplexer in order to switch between the omni-directional antenna ANT_omni and the directional antennas D_ANT_1-D_ANT_n. On the other hand, if all of the directional antennas D_ANT_1-D_ANT_n fail to optimize the quality of reception, or when the training packet process 30 cannot choose a directional antenna with the best receiving ability from the directional antennas D_ANT_1-D_ANT_n in time, the radio signal processing unit 110 may use the omni-directional antenna ANT_omni to receive the data signal S_data sent from the sending node NODE_S, which is still within the scope of the present invention.

Figure 4A:
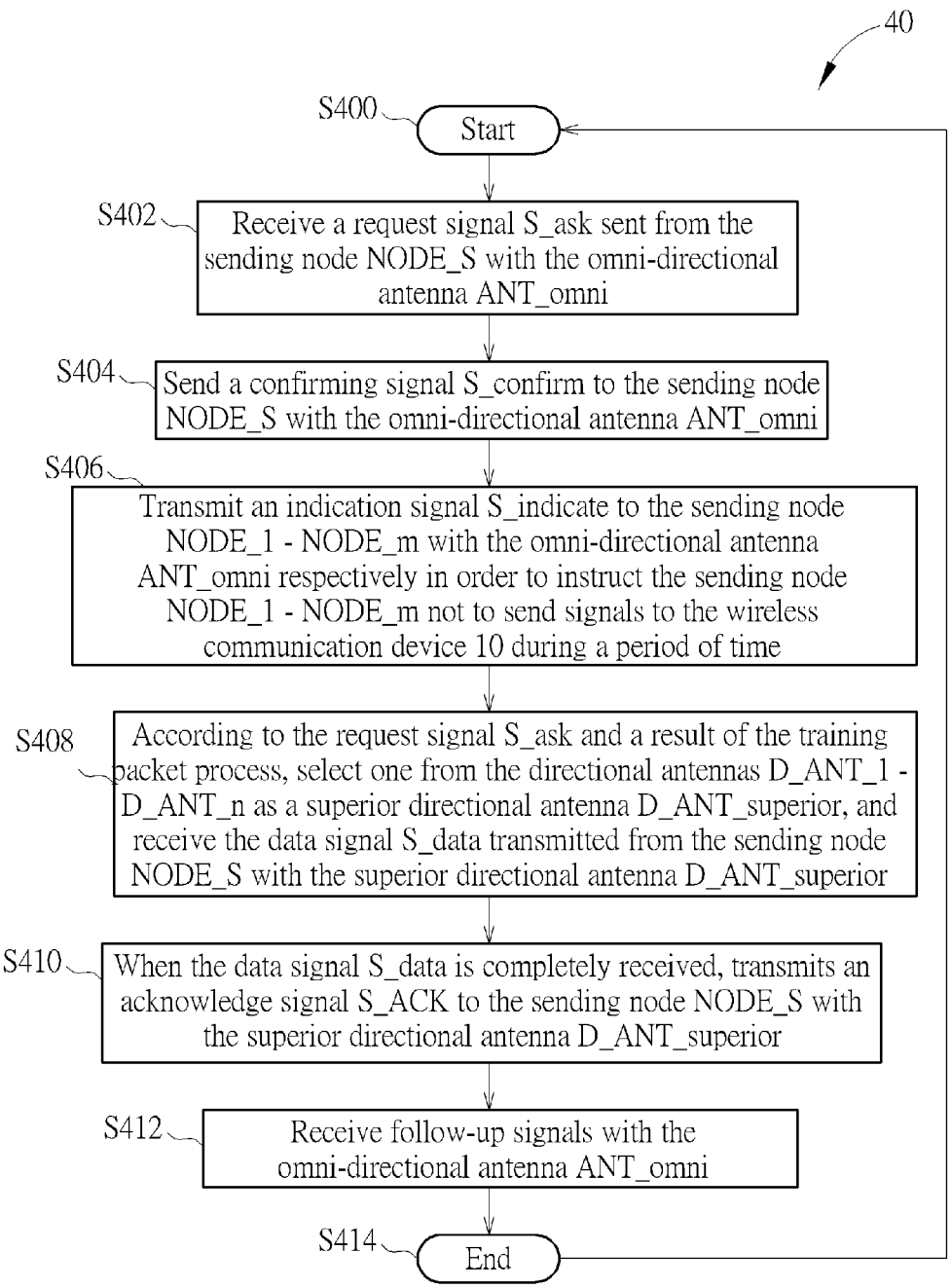
FIG. 4A is a flow schematic diagram illustrating a radio frequency signal processing method according to an embodiment of the present invention.
Figure 4B:
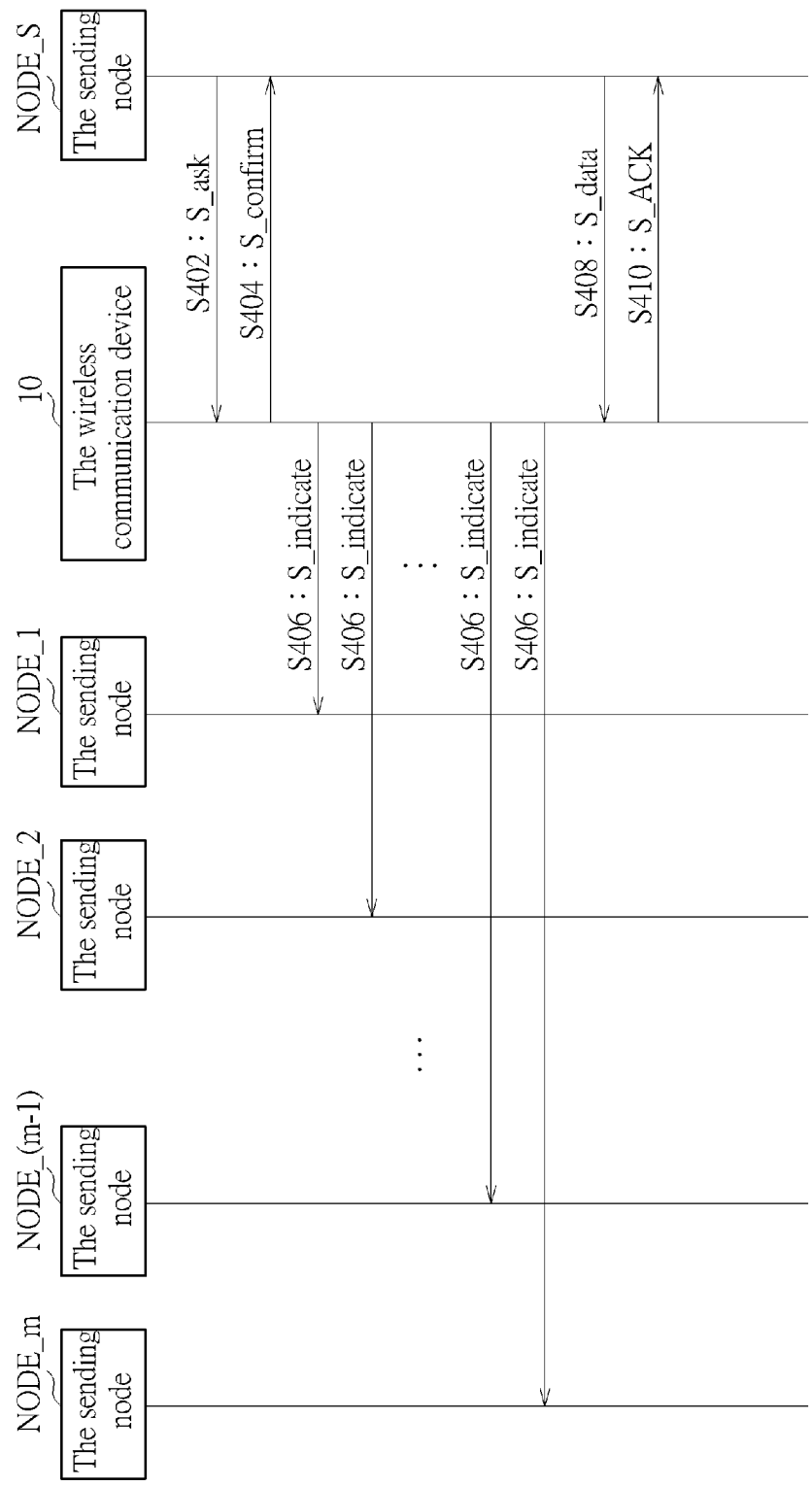
FIG. 4B is a sequence schematic diagram illustrating the radio frequency signal processing method.

To further ensure the quality of reception, the wireless communication device 10 may instruct other sending devices (i.e., other sending nodes) not to send signals when the wireless communication device 10 is receiving the data signal S_data in order to avoid signal collision. Please refer to FIGS. 4A and 4B. FIG. 4A is a flow schematic diagram illustrating a radio frequency signal processing method 40 according to an embodiment of the present invention. FIG. 4B is a sequence schematic diagram illustrating the radio frequency signal processing method 40. The radio frequency signal processing method 40 can be executed by the radio signal processing unit 110, and includes steps as follows.

Step S400: Start.

Step S402: Receive a request signal S_ask sent from the sending node NODE_S with the omni-directional antenna ANT_omni.

Step S404: Send a confirming signal S_confirm to the sending node NODE_S with the omni-directional antenna ANT_omni.

Step S406: Transmit an indication signal S_indicate to the sending node NODE_1-NODE_m with the omni-directional antenna ANT_omni respectively in order to instruct the sending node NODE_1-NODE_m not to send signals to the wireless communication device 10 during a period of time.

Step S408: According to the request signal S_ask and a result of the training packet process, select one from the directional antennas D_ANT_1-D_ANT_n as a superior directional antenna D_ANT_superior, and receive the data signal S_data transmitted from the sending node NODE_S with the superior directional antenna D_ANT_superior.

Step S410: When the data signal S_data is completely received, transmits an acknowledge signal S_ACK to the sending node NODE_S with the superior directional antenna D_ANT_superior.

Step S412: Receive follow-up signals with the omni-directional antenna ANT_omni.

Step S414: End.

Unlike the radio frequency signal processing method 20, after catching the request signal S_ask from the sending node NODE_S with the omni-directional antenna ANT_omni, the radio signal processing unit 110, according to the radio frequency signal processing method 40, not only sends the confirming signal S_confirm to instruct the sending node NODE_S to start transmitting the data signal S_data, but also respectively transmits (or broadcasts) the indication signal S_indicate to other sending nodes NODE_1-NODE_m in order to prevent the sending nodes NODE_1-NODE_m from sending signals to the wireless communication device 10, which may cause signal collision, when the radio signal processing unit 110 is receiving the data signal S_data.

On the other hand, since a wireless channel may be in a Line of Sight (LOS) path, the superior directional antenna D_ANT_superior can be the nearest antenna to the sending node NODE_S. However, a wireless channel may be blocked or obstructed by various obstacles, and the multipath effect arises from reflections and scattering by buildings, hills, leaves and so on. The effects of multipath include constructive and destructive interference and phase shifting of the signal, thereby limiting the capacity of such channel. In such a situation, the superior directional antenna D_ANT_superior may not have the best received signal strength indicator and the best packet error rate at the same time due to non-ideal factors. As a result, in the training packet process 30, the radio signal processing unit 110 may determine which of the directional antennas D_ANT_1-D_ANT_n has the best receiving ability according to a weighting W of the received signal strength indicator and the packet error rate so as to choose the superior directional antenna D_ANT_superior.

Besides, relative motion between the sending node NODE_S and the wireless communication device 10—that is, the motion of the sending node NODE_S with respect to the wireless communication device 10 regarded as fixed and vice versa—may cause characteristics of the channel to vary with time and thus increase uncertainty of signal quality. Therefore, a movement of the wireless communication device 10 maybe a factor to trigger the training packet process 30. In other words, once the wireless communication device 10 moves, the radio signal processing unit 110 determines which directional antenna has a best efficiency for the sending node NODE_S among the directional antennas D_ANT_1-D_ANT_n and selects it as the superior directional antenna D_ANT_superior. Alternatively, when receiving the data signal S_data, the radio signal processing unit 110 may switch over to a new superior directional antenna in order to ensure the quality of reception.

Because of the diversity and time-varying characteristic of channels, a currently used directional antenna may not be the directional antenna actually having the best efficiency. Therefore, the training packet process 30 may be triggered periodically (such as every predetermined time interval), so that the radio signal processing unit 110 can determine which of the directional antennas D_ANT_1-D_ANT_n corresponding to the sending node NODE_S has the best receiving ability and select it as the superior directional antenna D_ANT_superior. Alternatively, when receiving the data signal S_data, the radio signal processing unit 110 may switch over to a new superior directional antenna in order to ensure the quality of reception.

To sum up, the present invention utilizes an omni-directional antenna in order to catch signals from all directions and timely switch over to an appropriate directional antenna so as to receive data signals from a sending node. Accordingly, signal quality is improved, data rate increases and interference rarely occurs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A radio frequency signal processing method, adapted to a wireless communication device comprising an omni-directional antenna and a plurality of directional antennas, wherein the radio frequency signal processing method comprises:
    receiving a request signal from a first sending node with the omni-directional antenna, and sending a confirming signal to the first sending node with the omni-directional antenna, wherein the request signal is utilized to request the wireless communication device to receive a data signal;
    performing a training packet process for the plurality of directional antennas;
    receiving the data signal from the first sending node with a first directional antenna of the plurality of directional antennas according to a result of the training packet process; and
    transmitting an acknowledge signal to the first sending node with the first directional antenna after the data signal is completely received, and receiving subsequent signals with the omni-directional antenna after transmitting the acknowledge signal;
    wherein total amount of the data signal is respectively larger than total amount of the confirming signal and total amount of the acknowledge signal.

2. The radio frequency signal processing method of claim 1, wherein the training packet process comprises:
    each of the plurality of directional antennas respectively sending a first signal to the first sending node and respectively receiving a second signal from the first sending node; and
    selecting a directional antenna with the best receiving ability among the plurality of directional antenna as the first directional antenna according to the plurality of second signals.

3. The radio frequency signal processing method of claim 2, wherein the training packet process further comprises respectively calculating packet error rates and received signal strength indicators of the plurality of directional antennas according to the plurality of second signals in order to compare receiving ability of the plurality of directional antennas.

4. The radio frequency signal processing method of claim 1, wherein the wireless communication device transmits an indication signal to at least one second sending node after the omni-directional antenna receives the request signal from the first sending node in order to instruct the at least one second sending node not to send signals to the wireless communication device during a period of time.

5. A wireless communication device, comprising:
    an omni-directional antenna;
    a plurality of directional antennas; and
    a radio signal processing unit, configured to execute a radio frequency signal processing method, wherein the radio frequency signal processing method comprises:
        receiving a request signal from a first sending node with the omni-directional antenna, and sending a confirming signal to the first sending node with the omni-directional antenna, wherein the request signal is utilized to request the wireless communication device to receive a data signal;
        performing a training packet process for the plurality of directional antennas:
        receiving the data signal from the first sending node with a first directional antenna of the plurality of directional antennas according to a result of the training packet process; and
        transmitting an acknowledge signal to the first sending node with the first directional antenna after the data signal is completely received, and receiving subsequent signals with the omni-directional antenna after transmitting the acknowledge signal;
        wherein total amount of the data signal is respectively larger than total amount of the confirming signal and total amount of the acknowledge signal.

6. The wireless communication device of claim 5, wherein the training packet process comprises:

each of the plurality of directional antennas respectively sending a first signal to the first sending node and respectively receiving a second signal from the first sending node; and selecting a directional antenna with the best receiving ability among the plurality of directional antenna as the first directional antenna according to the plurality of second signals.

7. The wireless communication device of claim 6, wherein the training packet process further comprises respectively calculating packet error rates and received signal strength indicators of the plurality of directional antennas according to the plurality of second signals in order to compare receiving ability of the plurality of directional antennas.

8. The wireless communication device of claim 5, wherein the wireless communication device transmits an indication signal to at least one second sending node after the omni-directional antenna receives the request signal from the first sending node in order to instruct the at least one second sending node not to send signals to the wireless communication device during a period of time.

\* \* \* \* \*